(12) United States Patent
Kim et al.

(10) Patent No.: US 10,646,066 B2
(45) Date of Patent: May 12, 2020

(54) COFFEE EXTRACTION SYSTEM AND COFFEE EXTRACTION METHOD USING SAME

(71) Applicant: MAEIL DAIRIES CO., LTD, Seoul (KR)

(72) Inventors: Seon Hee Kim, Seoul (KR); Jae Hong Kang, Seoul (KR); Jin-Oh Yang, Seoul (KR); Jae Sung Lee, Gyeonggi-do (KR); Mi Young Han, Gyeonggi-do (KR); Soo Jin Choi, Incheon (KR); Seong Ah Cho, Seoul (KR); Heoung Sik Kong, Gyeonggi-do (KR); Ho Nam Chun, Gyeonggi-do (KR)

(73) Assignee: MAEIL DAIRIES CO., LTD., Seoul (KR)

( * ) Notice: Subject to any disclaimer, the term of this patent is extended or adjusted under 35 U.S.C. 154(b) by 32 days.

(21) Appl. No.: 15/755,323

(22) PCT Filed: Aug. 25, 2016

(86) PCT No.: PCT/KR2016/009423
§ 371 (c)(1),
(2) Date: Feb. 26, 2018

(87) PCT Pub. No.: WO2017/034339
PCT Pub. Date: Mar. 2, 2017

(65) Prior Publication Data
US 2018/0242777 A1   Aug. 30, 2018

(30) Foreign Application Priority Data
Aug. 26, 2015 (KR) .................. 10-2015-0120129
Aug. 26, 2015 (KR) .................. 10-2015-0120130

(51) Int. Cl.
| A47J 31/46 | (2006.01) |
| A47J 31/34 | (2006.01) |
| A23F 5/26 | (2006.01) |
| A47J 31/36 | (2006.01) |
| A47J 31/00 | (2006.01) |

(52) U.S. Cl.
CPC .......... *A47J 31/465* (2013.01); *A23F 5/262* (2013.01); *A47J 31/002* (2013.01); *A47J 31/34* (2013.01); *A47J 31/36* (2013.01); *A47J 31/467* (2013.01)

(58) Field of Classification Search
CPC ........ A47J 31/465; A47J 31/002; A47J 31/34; A47J 31/36; A47J 31/467; A23F 5/262
See application file for complete search history.

(56) References Cited

U.S. PATENT DOCUMENTS 1,648,699 A * 11/1927 Shroyer ............. A47J 31/007
                                                    99/315
3,085,496 A * 4/1963 Reynolds ............ G07F 13/065
                                                    99/289 R
(Continued)

FOREIGN PATENT DOCUMENTS

JP    2005-152242      6/2005
KR    100796015   *   1/2008
(Continued)

OTHER PUBLICATIONS

English Translation for KR2005152242 published Jun. 2005.*
English Translation for KR101306268 published Sep. 2013.*
English Translation for KR100796015 published Jan. 2008.*

*Primary Examiner* — Anthony J Weier
(74) *Attorney, Agent, or Firm* — Duane Morris LLP; Ji. Rodman Steele, Jr.; Gregory M. Lefkowitz (57) ABSTRACT

Shown are a coffee extraction system and a coffee extraction method using the same. A coffee extraction system, according to one embodiment of the present invention, includes: an extraction water storage tank which stores extraction water;
(Continued)

a body unit which accommodates ground coffee beans and includes a coffee extractor which is supplied with the extraction water from the extraction water storage tank to extract liquid coffee, wherein the coffee extractor accommodates the ground coffee beans and has a first extraction water supply channel communicating with the extraction water storage tank and with a side portion to which the extraction water is supplied; an upper cover, coupled to an upper portion of the body unit, which has a second extraction water supply channel, which communicates with the extraction water storage tank and through which the extraction water is supplied, and which has a first liquid coffee discharge channel through which the extracted liquid coffee is discharged; and a lower cover, coupled to a lower portion of the body unit, which has a third extraction water supply channel, which communicates with the extraction water storage tank and through which the extraction water is supplied, and which has a second liquid coffee discharge channel, through which the extracted liquid coffee is discharged.

15 Claims, 7 Drawing Sheets

(56) References Cited

U.S. PATENT DOCUMENTS

| 4,668,398 | A | * | 5/1987 | Silvis | B01D 11/0223 210/511 |
|---|---|---|---|---|---|
| 6,203,837 | B1 | * | 3/2001 | Kalenian | A23F 3/18 426/431 |
| 9,480,359 | B1 | * | 11/2016 | Kalenian | A23F 5/262 |
| 2006/0090652 | A1 | | 5/2006 | Greiwe | |
| 2013/0220137 | A1 | * | 8/2013 | Bombeck | A47J 31/46 99/287 |
| 2014/0079855 | A1 | * | 3/2014 | Yokoo | B65D 85/8043 426/432 |

FOREIGN PATENT DOCUMENTS

| KR | 1007960150000 | | 1/2008 |
|---|---|---|---|
| KR | 1007960170000 | | 1/2008 |
| KR | 101306268 | * | 9/2013 |
| KR | 1013062680000 | | 9/2013 |
| WO | 2012098725 | | 7/2012 |

* cited by examiner

COFFEE EXTRACTION SYSTEM AND COFFEE EXTRACTION METHOD USING SAME

CROSS-REFERENCE TO RELATED APPLICATIONS

This application is a § 371 national stage entry of International Application No. PCT/KR2016/009423, filed on Aug. 25, 2016, which claims priority to South Korean Patent Application No. 10-2015-0120129, filed on Aug. 26, 2015, and South Korean Patent Application No. 10-2015-0120130, filed on Aug. 26, 2015, the entire contents of which are incorporated herein by reference.

TECHNICAL FIELD

The present invention relates to a coffee extraction system and a coffee extraction method using the same, and more particularly, to a high-efficiency coffee extraction system, which is capable of ensuring the easy extraction of a coffee liquid and increasing the yield thereof and is also capable of preserving a unique coffee fragrance, and a coffee extraction method using the same.

BACKGROUND ART

In recent years, the demand for coffee has been increasing as living standards have risen with increasing income, and coffee manufacturers and coffee shops, which sell coffee based beverages, are gradually proliferating.

In particular, espresso coffee using coffee beans has come to be widely known as consumers become increasingly knowledgeable about coffee flavor and fragrance. Espresso coffee is a thick coffee liquid extracted by supplying high-pressure and high-temperature water to ground coffee beans.

In addition, as an example of a coffee having mild flavor and fragrance, Americano coffee, is made by adding hot water to espresso coffee. As described above, espresso coffee is the basic ingredient of various kinds of coffee based beverages.

Figure 1:
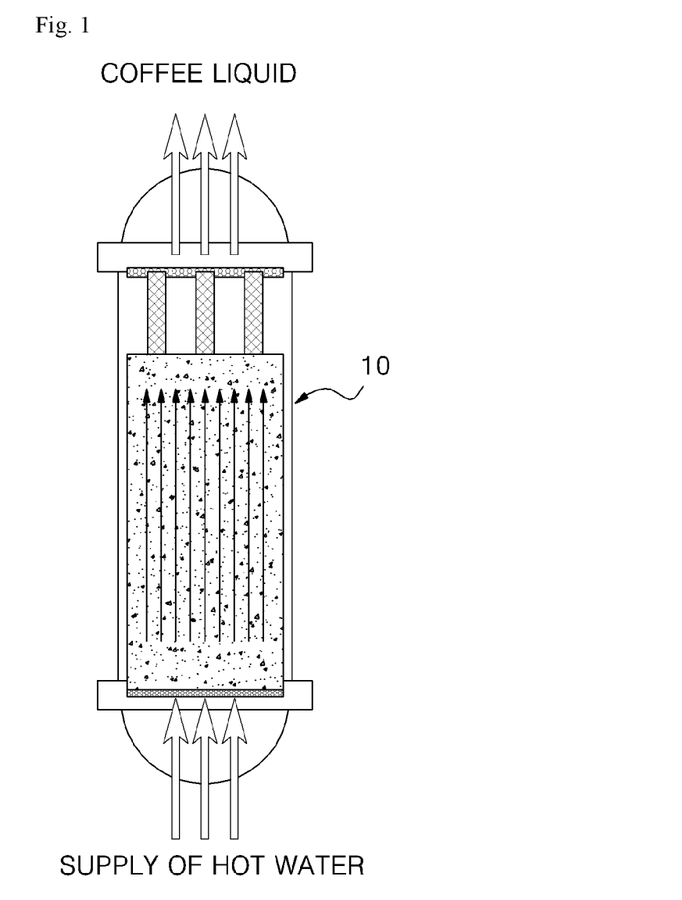
FIG. 1 is a view illustrating a process of extracting espresso coffee according to the related art.

FIG. 1 is a view illustrating a process of extracting espresso coffee according to the related art.

The process of extracting espresso coffee according to the related art will be described below with reference to FIG. 1.

To extract espresso coffee according to the related art, hot water is supplied to pass through a coffee extractor 10, in which ground coffee beans are accommodated, from the bottom to the top thereof using a transport pump so that the ground coffee beans are pressurized by the hot water, whereby a coffee liquid is extracted.

When espresso coffee is extracted according to the related art as described above, the ground coffee beans accumulate on the upper section of the coffee extractor 10 by the movement of the hot water. When a large amount of fine particulates having a small size of the ground coffee beans is distributed in a specific region inside the coffee extractor 10, flow resistance, which prevents the movement of the hot water, is increased, which causes pressure to be concentrated on a specific region inside the coffee extractor 10. Due to this, the distribution of pressure inside the coffee extractor 10 becomes unbalanced, which makes it difficult to extract a coffee liquid and reduces the yield thereof.

In addition, the coffee liquid extracted from the espresso coffee extractor 10 according to the related art contains bubbles, and the bubbles contain aroma ingredients that convey a unique coffee fragrance. However, because the bubbles generated in the process of extracting the coffee liquid are separated and discharged in the related art, there is a problem in that the extracted coffee liquid loses a lot of unique coffee fragrance.

PRIOR ART DOCUMENT

Patent Document

Korean Patent Registration No. 10-0796017 (published at 2008 Jan. 11)

DISCLOSURE

Technical Problem

Therefore, one technical object of the present invention to be solved is to provide a coffee extraction system, which may maintain the even distribution of pressure inside a coffee extractor, thereby ensuring the easy extraction of a coffee liquid and increasing the yield thereof, and a coffee extraction method using the same.

In addition, another technical object of the present invention to be solved is to provide a coffee extraction system, which may prevent the loss of unique coffee fragrance during a coffee extraction process, thereby preserving a unique coffee fragrance, and a coffee extraction method using the same.

Technical Solution

In accordance with an aspect of the present invention, the above and other objects can be accomplished by the provision of a coffee extraction system including an extraction water storage tank configured to store extraction water therein, and a coffee extractor configured to accommodate ground coffee beans therein and to extract a coffee liquid when receiving the extraction water from the extraction water storage tank, wherein the coffee extractor includes a body configured to accommodate the ground coffee beans therein, the body including a first extraction water supply channel, which is formed in a lateral portion of the body and is in communication with the extraction water storage tank for supply of the extraction water thereinto, an upper cover coupled to an upper section of the body, the upper cover including a second extraction water supply channel, which is in communication with the extraction water storage tank for supply of the extraction water thereinto, and a first coffee liquid discharge channel for discharge of an extracted coffee liquid therefrom, and a lower cover coupled to a lower section of the body, the lower cover including a third extraction water supply channel, which is in communication with the extraction water storage tank for supply of the extraction water thereinto, and a second coffee liquid discharge channel for discharge of the extracted coffee liquid therefrom.

The ground coffee beans may be separated and moved to the upper section and the lower section of the body and are pressurized by the extraction water supplied through the first extraction water supply channel so that the extracted coffee liquid is discharged through the first coffee liquid discharge channel and the second coffee liquid discharge channel, the ground coffee beans moved to the upper section of the body may be moved to and pressurized in the lower section of the body by the extraction water supplied through the second extraction water supply channel so that the extracted coffee liquid is discharged through the second coffee liquid discharge channel, and the ground coffee beans moved to the lower section of the body may be moved to and pressurized in the upper section of the body by the extraction water supplied through the third extraction water supply channel so that the extracted coffee liquid is discharged through the first coffee liquid discharge channel.

The upper cover may further include a bypass channel configured to adjust a pressure inside the body applied by the extraction water.

The upper cover may further include an air supply channel configured to supply air into the body in order to dry the ground coffee beans accommodated in the body after extraction of the coffee liquid, and the ground coffee beans dried inside the body may be separated and discharged from the body.

The coffee extractor may further include a separation net interposed between the upper cover and the body, and a support net interposed between the lower cover and the body.

Each of the separation net and the support net may include a plate having a size corresponding to an inner diameter of the body, and a plurality of holes uniformly distributed in the plate.

The coffee extraction system may further include a gas-liquid separator connected to the coffee extractor and configured to divide the coffee liquid containing bubbles extracted from the coffee extractor into a liquid-phase coffee component and a gas-phase coffee fragrance component, and a balance tank connected to the gas-liquid separator and configured to receive the liquid-phase coffee component and the gas-phase coffee fragrance component, which are introduced thereinto in a cooled state.

The coffee extraction system may further include a first cooler provided between the gas-liquid separator and the balance tank and configured to cool the gas-phase coffee fragrance component separated from the gas-liquid separator, and a second cooler provided between the gas-liquid separator and the balance tank and configured to cool the liquid-phase coffee component separated from the gas-liquid separator.

The coffee extraction system may further include a heat exchanger connected to the balance tank and configured to cool the coffee liquid in which the liquid-phase coffee component and the gas-phase coffee fragrance component are mixed with each other, and a coffee liquid storage tank connected to the heat exchanger and configured to store the mixed coffee liquid that has been cooled in the heat exchanger.

The coffee extraction system may further include at least one filter provided between the balance tank and the heat exchanger and configured to filter the mixed coffee liquid supplied from the balance tank to the heat exchanger.

In accordance with another aspect of the present invention, there is provided a coffee extraction method including accommodating ground coffee beans in a coffee extractor, and extracting a coffee liquid by supplying extraction water to the coffee extractor, wherein the extracting the coffee liquid includes separating and moving the ground coffee beans accommodated in the coffee extractor to an upper section and a lower section of the coffee extractor and then pressurizing the ground coffee beans to extract the coffee liquid by supplying the extraction water to the coffee extractor through a first extraction water supply channel, which is provided in a lateral portion of the coffee extractor, moving the ground coffee beans, moved to the upper section of the coffee extractor, to the lower section of the coffee extractor and then pressurizing the ground coffee beans to extract the coffee liquid by supplying the extraction water to the coffee extractor through a second extraction water supply channel, which is provided in a top of the coffee extractor, and moving the ground coffee beans, moved to the lower section of the coffee extractor, to the section portion of the coffee extractor and then pressurizing the ground coffee beans to extract the coffee liquid by supplying the extraction water to the coffee extractor through a third extraction water supply channel, which is provided in a bottom of the coffee extractor.

The extracting the coffee liquid may further include adjusting a pressure inside the coffee extractor using a bypass channel provided in the coffee extractor when the pressure inside the coffee extractor exceeds a predetermined pressure due to the extraction water supplied to the coffee extractor.

The coffee extraction method may further include dividing the coffee liquid, containing bubbles, extracted from the coffee extractor into a liquid-phase coffee component and a gas-phase coffee fragrance component by supplying the coffee liquid to a gas-liquid separator, and respectively cooling the liquid-phase coffee component and the gas-phase coffee fragrance component that have been separated from each other and supplying the liquid-phase coffee component and the gas-phase coffee fragrance component to a balance tank so as to mix the liquid-phase coffee component and the gas-phase coffee fragrance component with each other.

The coffee extraction method may further include cooling and storing the liquid-phase coffee component and the gas-phase coffee fragrance component that have been mixed in the balance tank using a heat exchanger after filtering the liquid-phase coffee component and the gas-phase coffee fragrance component.

The coffee extraction method may further include drying the ground coffee beans accommodated in the coffee extractor so as to separate and discharge the ground coffee beans from the coffee extractor after the coffee liquid is extracted.

Advantageous Effects

According to an embodiment of the present invention, the distribution of pressure, generated by extraction water, inside a coffee extractor, in which ground coffee beans are accommodated, may be evenly maintained, which may ensure the easy extraction of a coffee liquid and may increase the yield thereof.

According to an embodiment of the present invention, a coffee liquid containing bubbles extracted from the coffee extractor is divided into a liquid-phase coffee component and a gas-phase coffee fragrance component, and both the components are cooled respectively and are then mixed with each other, which may prevent the loss of unique coffee fragrance.

MODE FOR INVENTION

In order to sufficiently understand the present invention and advantages related to the operation of the present invention as well as the objects realized by the implementation of the present invention, it is required to reference the accompanying drawings that illustrate exemplary embodiments of the present invention and content described in connection with the accompanying drawings.

Hereinafter, the present invention will be described in detail through the description of exemplary embodiments of the present invention with reference to the accompanying drawings. The same reference numerals provided in the respective drawings indicate the same members.

Figure 2:
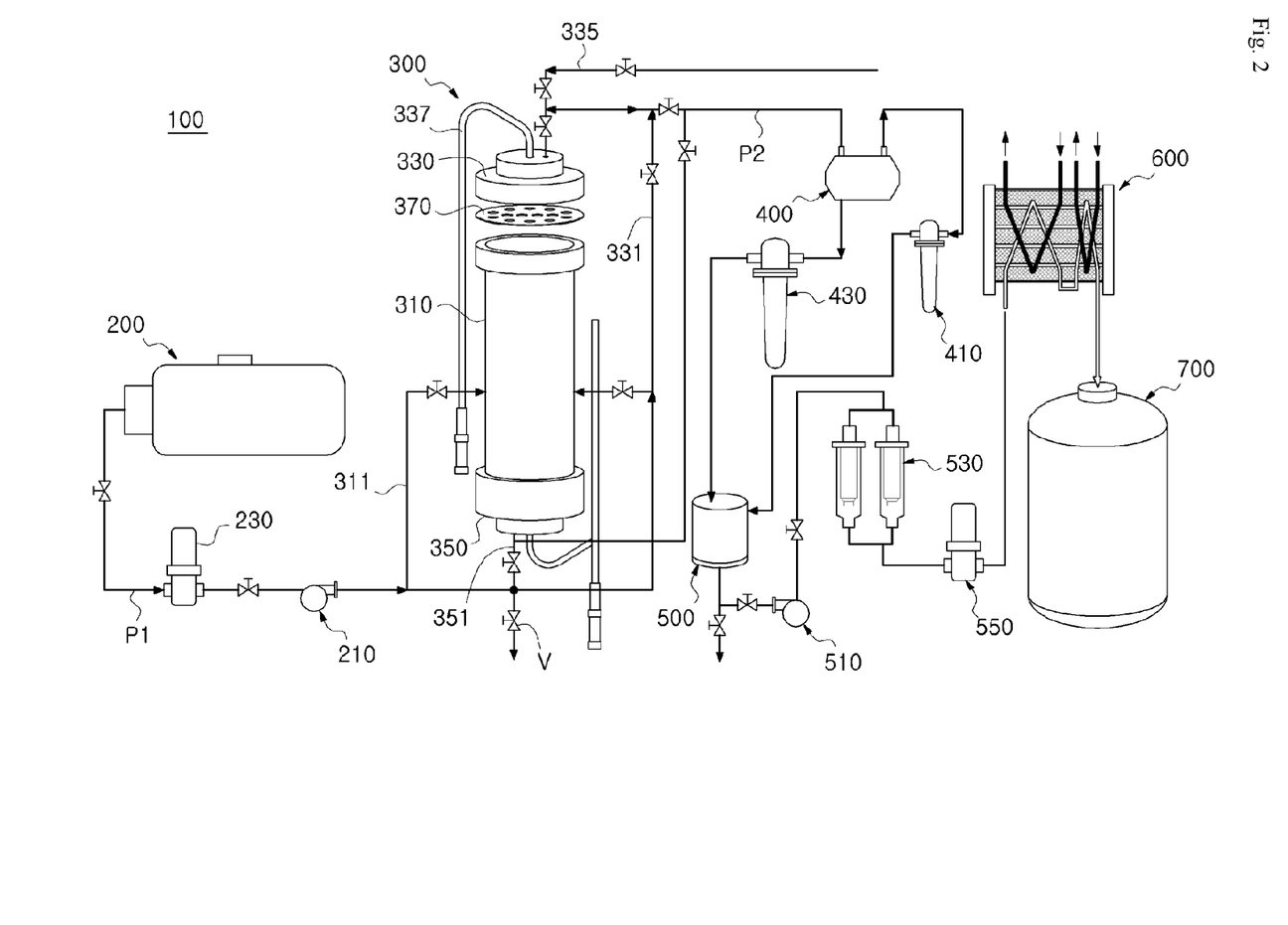
FIG. 2 is a view schematically illustrating the configuration of a coffee extraction system according to an embodiment of the present invention.
Figure 3A:
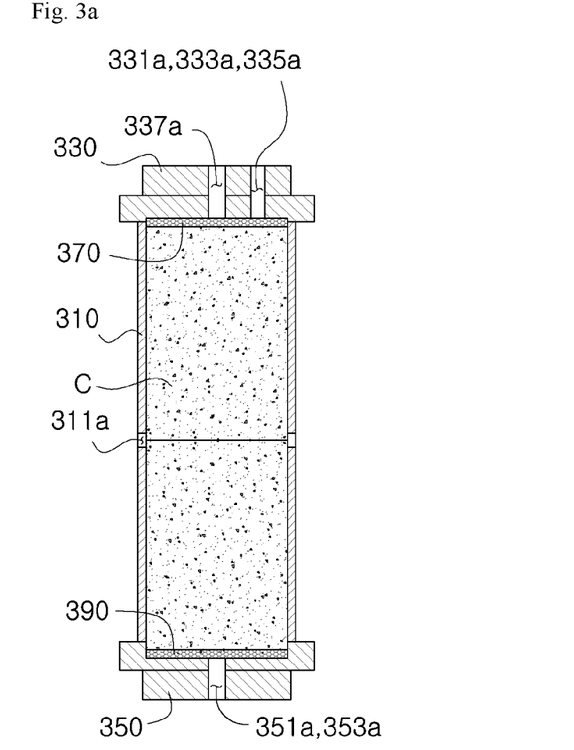
FIGS. 3a to 3d are views illustrating a coffee extraction process according to an embodiment of the present invention.
Figure 3B:
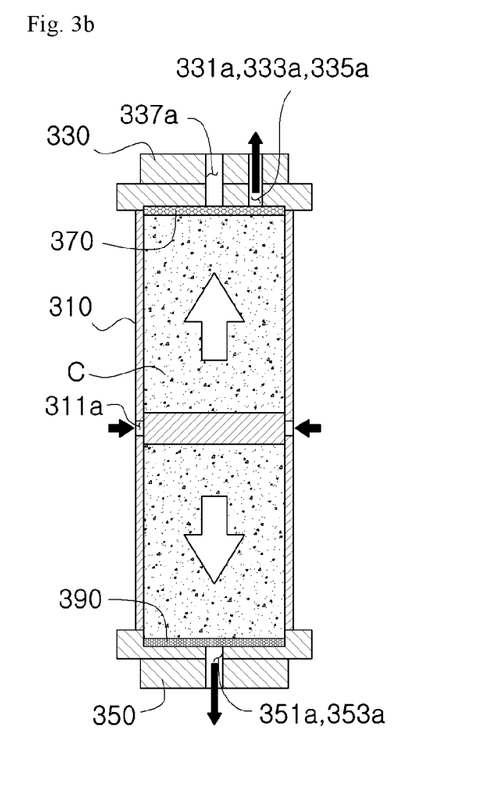
Figure 3C:
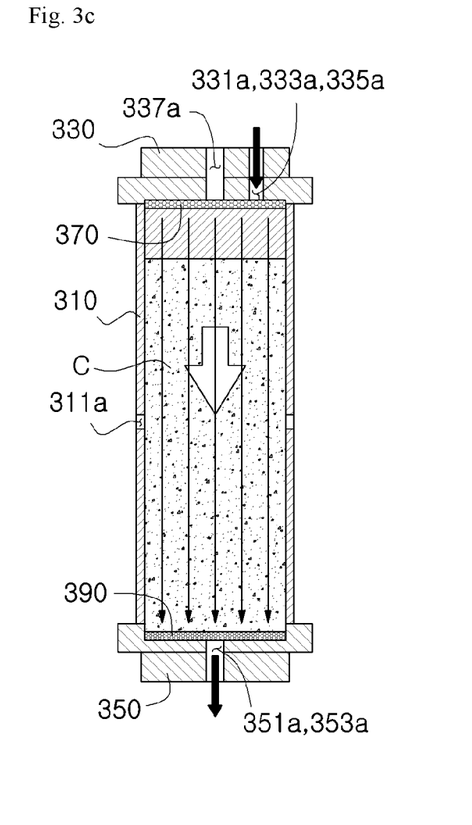
Figure 3D:
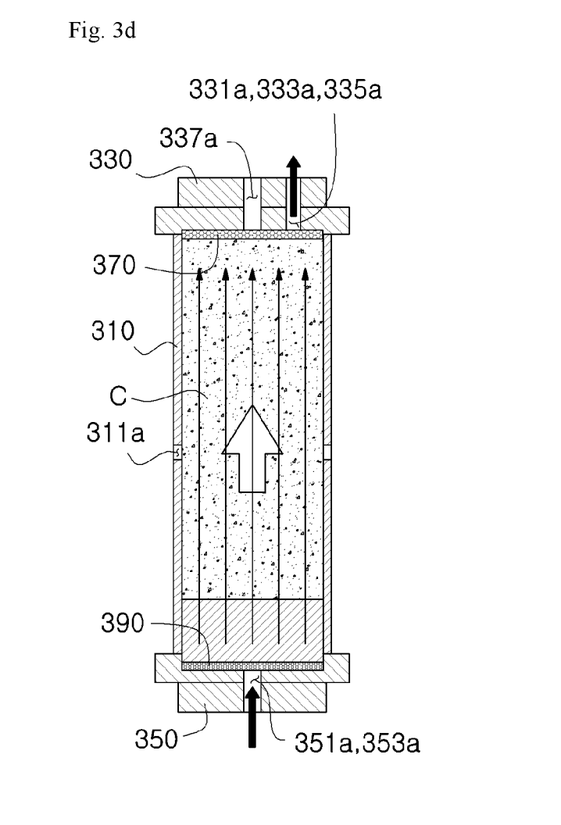
Figure 4:
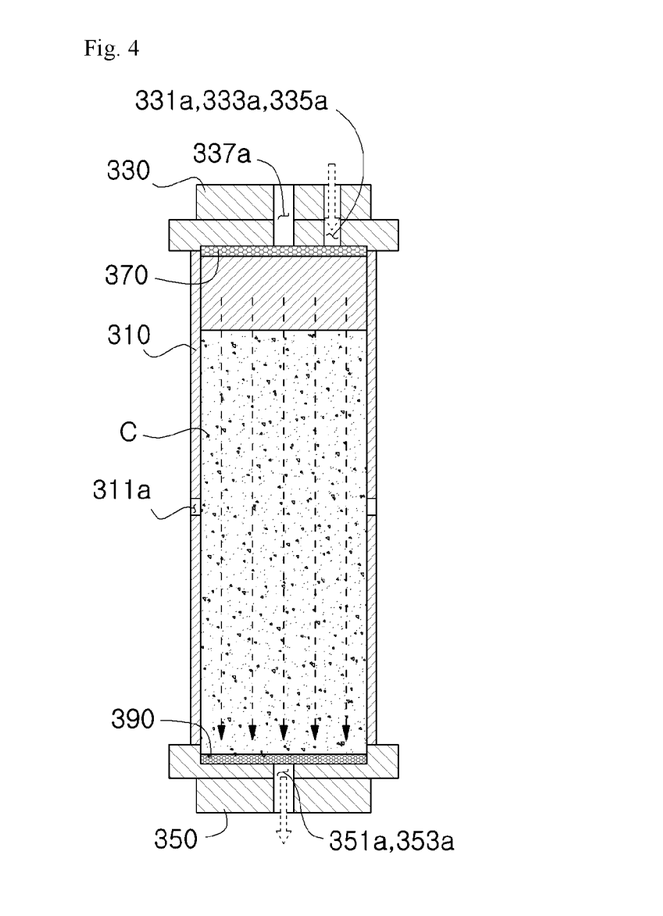
FIG. 4 is a view illustrating a drying process after the completion of the coffee extraction process according to an embodiment of the present invention.

FIG. 2 is a view schematically illustrating the configuration of a coffee extraction system according to an embodiment of the present invention, FIGS. 3A to 3D are views illustrating a coffee extraction process according to an embodiment of the present invention, and FIG. 4 is a view illustrating a drying process after the completion of the coffee extraction process according to an embodiment of the present invention.

Referring to FIG. 2, a coffee extraction system 100 according to an embodiment of the present invention includes an extraction water storage tank 200 in which extraction water is stored, a coffee extractor 300 in which ground coffee beans C are accommodated, the coffee extractor 300 being configured to extract a coffee liquid when receiving the extraction water, a gas-liquid separator 400, which divides the coffee liquid, containing bubbles, extracted from the coffee extractor 300 into a liquid-phase coffee component and a gas-phase coffee fragrance component, a balance tank 500 in which the liquid-phase coffee component and the gas-phase coffee fragrance component are mixed with each other, a heat exchanger 600, which is connected to the balance tank 500 and cools the mixed coffee liquid of the liquid-phase coffee component and the gas-phase coffee fragrance component, and a coffee liquid storage tank 700 in which the mixed coffee liquid cooled by the heat exchanger 600 is stored.

The extraction water storage tank 200 according to the present embodiment serves to store extraction water and to supply the extraction water to the coffee extractor 300.

In the present embodiment, the extraction water includes cold water of 10° C. or less, medium-temperature water of 30° C. to 50° C., and hot water of 90° C. to 100° C.

The extraction water stored in the extraction water storage tank 200 is supplied to the coffee extractor 300 through a first pipe P1. To this end, the first pipe P1 is provided with an extraction water transport pump 210 for supplying the extraction water to the coffee extractor 300.

The extraction water transport pump 210 provides power required to pressurize the ground coffee beans C using the extraction water in the coffee extractor 300, which will be described below.

In addition, in order to remove foreign substances from the extraction water while the extraction water moves through the first pipe P1, the first pipe P1 is provided with a first filter 230 for filtering the extraction water.

The extraction water that has passed through the first filter 230 is supplied to the coffee extractor 300.

In the present embodiment, the coffee extractor 300 serves to pressurize the ground coffee beans C accommodated therein when receiving the extraction water from the extraction water storage tank 200, thereby extracting a coffee liquid.

The coffee extractor 300 is connected so as to be in communication with the extraction water storage tank 200 and the first pipe P1.

Referring to FIG. 2 and FIGS. 3a to 3d, the coffee extractor 300 according to the present embodiment includes a body 310 in which the ground coffee beans C are accommodated, the body 310 having a first extraction water supply channel 311a formed in the lateral portion thereof, into which the extraction water is supplied, an upper cover 330, which is coupled to the top of the body 310 and has a second extraction water supply channel 331a into which the extraction water is supplied, and a lower cover 350, which is coupled to the bottom of the body 310 and has a third extraction water supply channel 351a into which the extraction water is supplied.

In addition, a separation net 370 is interposed between the upper cover 330 and the body 310, and a support net 390 is interposed between the lower cover 350 and the body 310.

In the present embodiment, each of the separation net 370 and the support net 390 may be formed by forming a plurality of holes in a plate having a size corresponding to the inner diameter of the body 310 so as to be uniformly distributed over the plate, or may be formed in a mesh shape.

Here, the first extraction water supply channel 311a, the second extraction water supply channel 331a, and the third extraction water supply channel 351a are connected so as to be in communication with the first pipe P1.

In addition, as the extraction water stored in the extraction water storage tank 200 moves through the first pipe P1, the extraction water moves to the first extraction water supply channel 311a, which is in communication with a first extraction water supply pipe 311 diverged from the first pipe P1, the second extraction water supply channel 331a, which is in communication with a second extraction water supply pipe 331 diverged from the first pipe P1, and the third extraction water supply channel 351a, which is in communication with a third extraction water supply pipe 351 diverged from the first pipe P1, thereby being supplied to the coffee extractor 300 (specifically, the body 310).

Meanwhile, when the extraction water is hot water, the extraction water, which initially moves along the first pipe P1, is cooled by the first pipe P1. Therefore, a discharge valve V provided on the first pipe P1 is opened to discharge the extraction water outward until the extraction water to be supplied to the coffee extractor 300 reaches a predetermined temperature (within a range from 90° C. to 100° C.).

In addition, in the present embodiment, the ground coffee beans C accommodated in the body 310 have an average particle size within a range from approximately 1.0 mm to 1.8 mm and a volume within a range from 28% to 36% of the volume of the body 310.

When the average particle size of the ground coffee beans C is less than the range from 1.0 mm to 1.8 mm, the ground coffee beans C prevent the movement of the extraction water, causing a reduction in the amount of extracted coffee liquid. When the average particle size of the ground coffee beans C is greater than the range from 1.0 mm to 1.8 mm, sufficient pressure required to pressurize the ground coffee beans C is not generated, which makes it difficult to extract the coffee liquid.

As illustrated in FIGS. 3a to 3d, the coffee extractor 300 according to the present embodiment extracts a coffee liquid using the extraction water that is sequentially supplied through the first extraction water supply channel 311a, the second extraction water supply channel 331a, and the third extraction water supply channel 351a.

Although the second extraction water supply channel 331a and a first coffee liquid discharge channel 333a are illustrated as being the same in FIGS. 3a to 3d, they may be separately formed. Likewise, although the third extraction water supply channel 351a and a second coffee liquid discharge channel 353a are illustrated as being the same in FIGS. 3a to 3d, they may be separately formed.

A process of extracting a coffee liquid will be described below with reference to FIGS. 3a to 3d.

In the present embodiment, a process of extracting a coffee liquid having a concentration of 3.0 brix or more by introducing 2000 l of extraction water for 200 kg of ground coffee beans C will be described.

As illustrated in FIG. 3a, the body 310 of the coffee extractor 300 is filled with 200 kg of ground coffee beans C.

Subsequently, as illustrated in FIG. 3b, extraction water is supplied to the first extraction water supply channel 311a, which is provided in the lateral portion of the body 310, so that the ground coffee beans C accommodated in the body 310 are separated and moved to the upper section and the lower section of the body 310 and are brought into contact with each other. Then, the ground coffee beans C, which have been separately moved to the upper section and the lower section of the body 310, are pressurized by the extraction water, whereby a coffee liquid is extracted.

Specifically, 900 l of extraction water is supplied to the first extraction water supply channel 311a, which is provided in the lateral portion of the body 310, the ground coffee beans C are separated and moved to the upper section and the lower section of the body 310 and are then pressurized by the extraction water, and the coffee liquid extracted by the pressurization of the extraction water is discharged in a given amount through the first coffee liquid discharge channel 333a and the second coffee liquid discharge channel 353a, which are provided respectively in the upper cover 330 and the lower cover 350. At this time, the pressure inside the body 310 generated by the extraction water remains at 8~9 kgf/cm².

In addition, since the ground coffee beans C are separated and moved to the upper section and the lower section inside the body 310 by the extraction water, fine particulates having a small size of the ground coffee beans C are uniformly distributed in the upper section and the lower section of the body 310.

Meanwhile, in the present embodiment, at least one or more first extraction water supply channels 311a may be provided along the outer wall periphery of the body 310, but the scope of the present invention is not limited as to the number of first extraction water supply channels 311a.

In addition, in the present embodiment, since the ground coffee beans C accommodated in the body 310 are squeezed by the weight thereof, the first extraction water supply channel 311a may be formed at a height corresponding to 40% a height from the lower end of the body 310.

In addition, as illustrated in FIG. 3C, extraction water is supplied to the second extraction water supply channel 331a, which is provided above the body 310, causing the ground coffee beans C accommodated in the body 310 to be moved to the lower section of the body 310 and be brought into close contact with each other. The ground coffee beans C moved to the lower section inside the body 310 are pressurized by the extraction water, whereby a coffee liquid is extracted.

Specifically, 300 l of extraction water is supplied to the second extraction water supply channel 331a provided in the upper cover 330, the ground coffee beans C accommodated in the upper section of the body 310 are moved to are pressurized in the lower section of the body 310 by the extraction water, and the coffee liquid extracted by the pressurization of the extraction water is discharged in a given amount through the second coffee liquid discharge channel 353a provided in the lower cover 350 below the body 310. At this time, the extraction water supplied to the second extraction water supply channel 331a is uniformly introduced from the upper section to the lower section of the body 310 by the holes uniformly distributed in the separation net 370. At this time, although the pressure inside the body 310 generated by the extraction water corresponds to 16~18 kgf/cm², the pressure inside the body 310 is kept at 16 kgf/cm² or less by a bypass channel 317a, which will be described below.

In addition, since the ground coffee beans C, located in the upper section of the body 310, are moved to the lower section of the body 310, fine particulates having a small size of the ground coffee beans C are moved to the lower section of the body 310. Thereby, when the extraction water is supplied from the lower section to the upper section of the body 310, which will be described below, so as to enable the extraction of a coffee liquid, the amount of fine particulates having the small size of the ground coffee beans C included in the extracted coffee liquid may be remarkably reduced.

Meanwhile, in the present embodiment, at least one or more second extraction water supply channels 331a may be provided in the upper cover 330, but the scope of the present invention is not limited as to the number of second extraction water supply channels 331a.

In addition, as illustrated in FIG. 3d, extraction water is supplied to the third extraction water supply channel 351a, which is provided below the body 310, causing the ground coffee beans C accommodated in the body 310 to be moved to and pressurized in the upper section, whereby a coffee liquid is extracted.

Specifically, 800 l of extraction water is supplied to the third extraction water supply channel 351a provided in the lower cover 350, the ground coffee beans C accommodated in the lower section of the body 310 are moved to and are pressurized in the upper section of the body 310 by the extraction water, and the coffee liquid extracted by the pressurization of the extraction water is discharged in a given amount through the first coffee liquid discharge channel 333a provided in the upper cover 330 above the body 310. At this time, the extraction water supplied to the third extraction water supply channel 351a is uniformly introduced from the lower section to the upper section of the body 310 by the holes uniformly distributed in the support net 390, and the pressure inside the body 310 generated by the extraction water is kept at 12~14 kgf/cm².

Meanwhile, in the present embodiment, at least one or more third extraction water supply channels 351a may be provided in the lower cover 350, but the scope of the present invention is not limited as to the number of third extraction water supply channels 351a.

In addition, the coffee liquid extracted through the third extraction water supply channel 351a is discharged through the first coffee liquid discharge channel 333a.

As described above, in the process of extracting the coffee liquid according to the present embodiment, first, the extraction water is supplied to the first extraction water supply channel 311a provided in the lateral portion of the body 310 so that the ground coffee beans C are separated and moved to the upper section and the lower section of the body 310 so as to implement the extraction of a coffee liquid. Then, the extraction water is supplied to the second extraction water supply channel 331a, which is provided above the body 310, so that the ground coffee beans C are moved to the lower section of the body 310 so as to implement the extraction of a coffee liquid. Then, the extraction water is supplied to the third extraction water supply channel 351a provided below the body 310 so that the ground coffee beans C are moved to the upper section of the body 310 so as to implement the extraction of a coffee liquid.

As described above, when the extraction water is sequentially supplied to the lateral portion, the top and the bottom of the body 310 so as to move the ground coffee beans C to the upper section and the lower section of the body 310, the ground coffee beans C may be uniformly distributed inside the body 310, and therefore the distribution of pressure inside the body 310 generated by the extraction water may be uniformly maintained, which may ensure the easy extraction of a coffee liquid and may increase the yield thereof.

That is, in the present embodiment, since the extraction water is sequentially supplied to the lateral portion, the top and the bottom of the body 310 so that the ground coffee beans C accommodated in the body 310 are sufficiently moistened with the extraction water and are moved to the upper section and the lower section inside the body 310, fine particulates of the ground coffee beans C may be uniformly distributed inside the body 310. Accordingly, the distribution of pressure inside the body 310 may be uniformly maintained, which may ensure the easy extraction of a coffee liquid and may increase the yield of an extracted coffee liquid since the rate of compression of the ground coffee beans C compressed inside the body 310 is increased from the range from 10% to 15% in the related art to the range from 20% to 25%. In addition, in the present embodiment, since the ground coffee beans C are uniformly distributed in the body 310, the extraction water may be uniformly dispersed, which may be advantageous for the extraction of a high-concentration coffee liquid.

Meanwhile, when the pressure inside the body 310 generated by the extraction water exceeds a predetermined pressure, this may prevent the movement of the extraction water, thereby making it impossible to supply the extraction water into the body 310. Therefore, there is a need to adjust the pressure inside the body 310.

Accordingly, the coffee extractor 300 according to the present embodiment may further include the bypass channel 317a provided in the upper cover 330 in order to adjust the pressure inside the body 310 when the pressure inside the body 310 generated by the extraction water exceeds a predetermined pressure (16 kgf/cm$^2$).

In particular, when the pressure inside the body 310 exceeds a predetermined pressure (16 kgf/cm$^2$) by the extraction water supplied through the second extraction water supply channel 331a, the extraction water is discharged outward through the bypass channel 337a so that the pressure inside the body 310 is maintained at the predetermined pressure (16 kgf/cm$^2$).

The coffee liquid extracted by the coffee extractor 300 as described above contains bubbles, and the bubbles include aroma ingredients that convey the unique coffee fragrance.

However, in the related art, since bubbles generated in the process of extracting the coffee liquid are separated and discharged, there has been a problem in that the extracted coffee liquid loses a large amount of its unique coffee fragrance.

Accordingly, the coffee extraction system 100 according to the embodiment of the present invention includes the gas-liquid separator 400, which divides the coffee liquid containing bubbles extracted from the coffee extractor 300 into a liquid-phase coffee component and a gas-phase coffee fragrance component, in order to separate and mix the gas-phase coffee fragrance component, which includes aroma ingredients that convey the unique coffee fragrance, and the liquid-phase coffee component for maintaining the unique coffee fragrance.

The gas-liquid separator 400 according to the present embodiment is connected to a second pipe P2, which is connected so as to be in communication with the coffee extractor 300, and serves to divide the coffee liquid containing bubbles into a liquid-phase coffee component and a gas-phase coffee fragrance component.

The coffee liquid, discharged through the first coffee liquid discharge channel 333a and the second coffee liquid discharge channel 353a, is supplied to the gas-liquid separator 400 through the second pipe P2.

Then, the liquid-phase coffee component and the gas-phase coffee fragrance component, separated in the gas-liquid separator 400, are cooled and are then supplied to the balance tank 500, which will be described below, so as to be mixed with each other in the balance tank 500. This serves to rapidly cool and condense the gas-phase coffee fragrance component, which contains aroma ingredients that convey the unique coffee fragrance, thereby preventing the outward loss of unique coffee fragrance.

Accordingly, the coffee extraction system 100 according to the embodiment of the present invention further includes a first cooler 410, which is provided between the gas-liquid separator 400 and the balance tank 500 and cools the gas-phase coffee fragrance component separated in the gas-liquid separator 400.

In addition, the coffee extraction system 100 according to the embodiment of the present invention further includes a second cooler 430, which is provided between the gas-liquid separator 400 and the balance tank 500 and cools the liquid-phase coffee component separated in the gas-liquid separator 400, in order to allow a greater amount of the cooled gas-phase coffee fragrance component to be melted in and mixed with the liquid-phase coffee component.

The first cooler 410 and the second cooler 430 are respectively connected so as to be in communication with the gas-liquid separator 400 and the balance tank 500. The gas-phase coffee fragrance component cooled and condensed by the first cooler 410 and the liquid-phase gas component cooled by the second cooler 430 are introduced into and mixed in the balance tank 500.

The mixed coffee liquid, stored in the balance tank 500, is transported to the heat exchanger 600 by way of a second filter 530, which includes a fine filtering net, and a third filter 550, which includes a mesh filter, by an extracted liquid transport pump 510, and thereafter is cooled in the heat exchanger 600.

In the present embodiment, the coffee liquid introduced into the heat exchanger 600 is primarily cooled using cooling water having a temperature from 16° C. to 20° C., preferably, 18° C., and is rapidly secondarily cooled using cooling water having a temperature from 2° C. to 6° C., preferably, 4° C., so as to maintain unique coffee flavor and fragrance.

Then, the coffee liquid cooled in the heat exchanger 600 is transported to and stored in the coffee liquid storage tank 700.

Meanwhile, when the coffee extraction process is completed, the ground coffee beans C accommodated in the coffee extractor 300 are separated and discharged from the body 310.

As illustrated in FIG. 4, in a process of separating and discharging the ground coffee beans C from the body 310, dry air is supplied into the body 310 through an air supply channel 335a provided in the upper cover 330 of the coffee extractor 300.

As illustrated in FIG. 2, in the present embodiment, an air supply pipe 335 may be diverged from the second pipe P2, and may be connected so as to be in communication with the air supply channel 335a.

In addition, although the second extraction water supply channel 331a, the first coffee liquid discharge channel 333a and the air supply channel 335a are illustrated as being the same in FIGS. 3a to 3d and FIG. 4, they may be separately formed.

The ground coffee beans C accommodated in the body 310 are dried by the dry air introduced into the body 310. Then, the dried ground coffee beans C are discharged after the lower cover 350 is separated from the body 310.

As such, since the ground coffee beans C accommodated in the coffee extractor 300 are dried and are then separated and discharged after the coffee extraction process is completed, the generation of leachate, which may be generated after the coffee extraction process, may be reduced.

Although an embodiment of the present invention has been described above, modifications and variations of the present invention can be made via additions, modifications and omission of constituent elements by those skilled in the art without departing from the gist of the appended claims. Thus, it is intended that such modifications and variations should not be understood independently of the technical sprit or prospect of the disclosure.

INDUSTRIAL APPLICABILITY

The present invention may ensure the easy extraction of a coffee liquid, may increase the yield of the coffee liquid, and may maintain unique coffee fragrance.

The invention claimed is:

1. A coffee extraction system comprising:
an extraction water storage tank configured to store extraction water therein; and
a coffee extractor configured to accommodate ground coffee beans therein and to extract a coffee liquid when receiving the extraction water from the extraction water storage tank,
wherein the coffee extractor includes:
a body configured to accommodate the ground coffee beans therein, the body including a first extraction water supply channel, which is formed in a lateral portion of the body and is in communication with the extraction water storage tank for supply of the extraction water thereinto;
an upper cover coupled to an upper section of the body, the upper cover including a second extraction water supply channel, which is in communication with the extraction water storage tank for supply of the extraction water thereinto, and a first coffee liquid discharge channel for discharge of an extracted coffee liquid therefrom; and
a lower cover coupled to a lower section of the body, the lower cover including a third extraction water supply channel, which is in communication with the extraction water storage tank for supply of the extraction water thereinto, and a second coffee liquid discharge channel for discharge of the extracted coffee liquid therefrom.

2. The coffee extraction system according to claim 1, wherein the ground coffee beans are separated and moved by the extraction water supplied through the first extraction water supply channel to the upper section and the lower section of the body and are pressurized by the extraction water supplied through the first extraction water supply channel so that the extracted coffee liquid is discharged through the first coffee liquid discharge channel and the second coffee liquid discharge channel,
wherein the ground coffee beans moved to the upper section of the body are moved to and pressurized in the lower section of the body by the extraction water supplied through the second extraction water supply channel so that the extracted coffee liquid is discharged through the second coffee liquid discharge channel, and
wherein the ground coffee beans moved to the lower section of the body are moved to and pressurized in the upper section of the body by the extraction water supplied through the third extraction water supply channel so that the extracted coffee liquid is discharged through the first coffee liquid discharge channel.

3. The coffee extraction system according to claim 1, wherein the upper cover further includes a bypass channel configured to adjust a pressure inside the body applied by the extraction water.

4. The coffee extraction system according to claim 1, wherein the upper cover further includes an air supply channel configured to supply air into the body in order to dry the ground coffee beans accommodated in the body after extraction of the coffee liquid, and
wherein the ground coffee beans dried inside the body are separated and discharged from the body.

5. The coffee extraction system according to claim 1, wherein the coffee extractor further includes:
a separation net interposed between the upper cover and the body; and
a support net interposed between the lower cover and the body.

6. The coffee extraction system according to claim 5, wherein each of the separation net and the support net includes:
a plate having a size corresponding to an inner diameter of the body; and
a plurality of holes uniformly distributed in the plate.

7. The coffee extraction system according to claim 1, further comprising:
a gas-liquid separator connected to the coffee extractor and configured to divide the coffee liquid containing bubbles extracted from the coffee extractor into a liquid-phase coffee component and a gas-phase coffee fragrance component; and
a balance tank connected to the gas-liquid separator and configured to receive the liquid-phase coffee component and the gas-phase coffee fragrance component, which are introduced thereinto in a cooled state.

8. The coffee extraction system according to claim 7, further comprising:
a first cooler provided between the gas-liquid separator and the balance tank and configured to cool the gas-phase coffee fragrance component separated from the gas-liquid separator; and
a second cooler provided between the gas-liquid separator and the balance tank and configured to cool the liquid-phase coffee component separated from the gas-liquid separator.

9. The coffee extraction system according to claim 7, further comprising:
a heat exchanger connected to the balance tank and configured to cool the coffee liquid in which the liquid-phase coffee component and the gas-phase coffee fragrance component are mixed with each other; and a coffee liquid storage tank connected to the heat exchanger and configured to store the mixed coffee liquid that has been cooled in the heat exchanger.

10. The coffee extraction system according to claim 7, further comprising at least one filter provided between the balance tank and the heat exchanger and configured to filter the mixed coffee liquid supplied from the balance tank to the heat exchanger.

11. A coffee extraction method comprising:
accommodating ground coffee beans in a coffee extractor; and
extracting a coffee liquid by supplying extraction water to the coffee extractor,
wherein the extracting the coffee liquid includes:
separating and moving the ground coffee beans accommodated in the coffee extractor to an upper section and a lower section of the coffee extractor by extraction water supplied through a first extraction water supply channel and then pressurizing the ground coffee beans to extract the coffee liquid by supplying the extraction water to the coffee extractor through the first extraction water supply channel, which is provided in a lateral portion of the coffee extractor;
moving the ground coffee beans, moved to the upper section of the coffee extractor, to the lower section of the coffee extractor and then pressurizing the ground coffee beans to extract the coffee liquid by supplying the extraction water to the coffee extractor through a second extraction water supply channel, which is provided in a top of the coffee extractor; and
moving the ground coffee beans, moved to the lower section of the coffee extractor, to the section portion of the coffee extractor and then pressurizing the ground coffee beans to extract the coffee liquid by supplying the extraction water to the coffee extractor through a third extraction water supply channel, which is provided in a bottom of the coffee extractor.

12. The coffee extraction method according to claim 11, wherein the extracting the coffee liquid further includes adjusting a pressure inside the coffee extractor using a bypass channel provided in the coffee extractor when the pressure inside the coffee extractor exceeds a predetermined pressure due to the extraction water supplied to the coffee extractor.

13. The coffee extraction method according to claim 11, further comprising:
dividing the coffee liquid, containing bubbles, extracted from the coffee extractor into a liquid-phase coffee component and a gas-phase coffee fragrance component by supplying the coffee liquid to a gas-liquid separator; and
respectively cooling the liquid-phase coffee component and the gas-phase coffee fragrance component that have been separated from each other and supplying the liquid-phase coffee component and the gas-phase coffee fragrance component to a balance tank so as to mix the liquid-phase coffee component and the gas-phase coffee fragrance component with each other.

14. The coffee extraction method according to claim 13, further comprising cooling and storing the liquid-phase coffee component and the gas-phase coffee fragrance component that have been mixed in the balance tank using a heat exchanger after filtering the liquid-phase coffee component and the gas-phase coffee fragrance component.

15. The coffee extraction method according to claim 11, further comprising drying the ground coffee beans accommodated in the coffee extractor so as to separate and discharge the ground coffee beans from the coffee extractor after the coffee liquid is extracted.

* * * * *